Patented Feb. 6, 1940

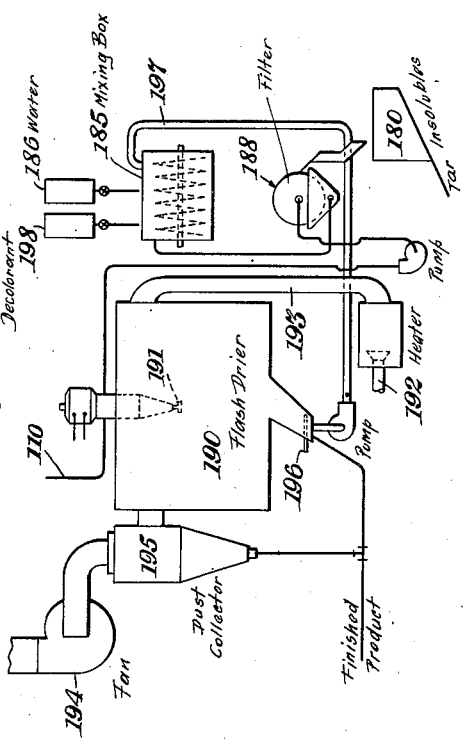

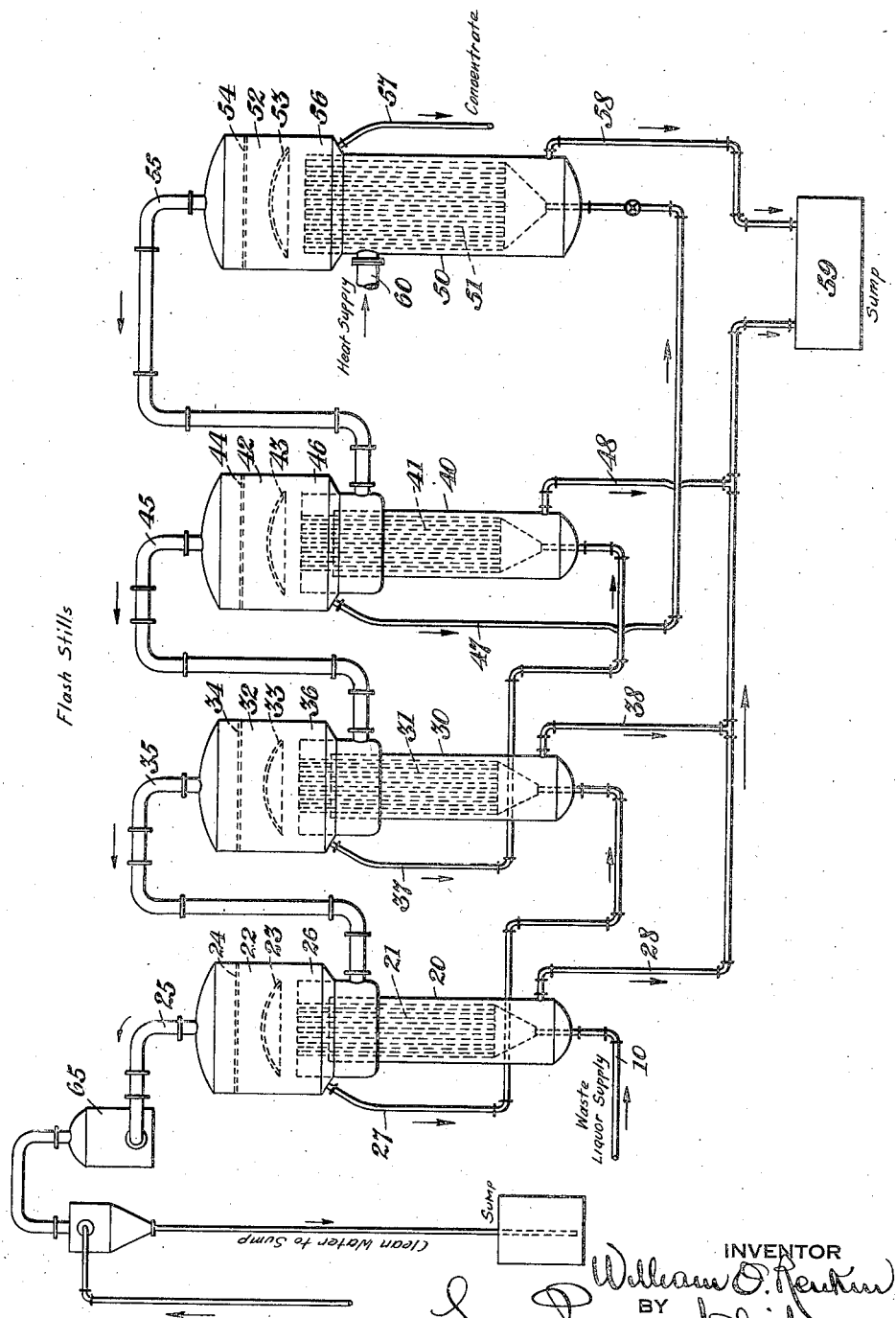

2,189,083

UNITED STATES PATENT OFFICE 2,189,083

DISPOSAL PROCESS FOR THE TREATMENT OF WEAK AMMONIACAL WASTE LIQUORS FROM COAL DISTILLATION PLANTS

William O. Renkin, New York, N. Y., assignor to Lancaster Iron Works, Inc., Lancaster, Pa., a corporation of Pennsylvania Application October 23, 1937, Serial No. 170,578

8 Claims. (Cl. 23—100)

My present invention relates to methods and apparatus for the purification or clarification of the noxious waste liquors which result from the operation of by-product coke oven plants and to the manufacture of commercial ammonium chloride powders from such liquors.

In the operation of by-product coke oven plants, the liquid coming from the cooling gas mains, etc., commonly called "gas liquor" or "ammonia liquor" is passed through a free ammonia tower where the greater part of the free ammonia is distilled off and passed on to a sulphuretor producing ammonium sulphate. When the phenolic content of the liquor effluent from the free ammonia still is sufficient to make phenol recovery practical or necessary, the effluent is passed to a dephenolization tower where the greater part of the phenol is recovered and discharged as sodium phenolate, the phenol removal being generally from 95% to 98% of the original phenol content. The liquid passing from the dephenolization tower constitutes a noxious waste called "weak ammonia liquor" containing ammonia, chlorine, sulphur, phenol, tar, coal dust, coke dust, and other impurities, and this weak ammonia liquor has given rise to nuisances so serious as to threaten the legal operation of the coal distillation plants. It has been the common practice to pass this weak ammonia liquor through an additional or "fixed" ammonia still where lime is added, changing the ammonia chloride base solution to a calcium chloride base to enable the liquor to be commercially handled. This lime treatment, while fixing a substantial part of the ammonia, results in a waste liquor, commonly called "still waste", which contains all of the above substances and calcium salts in addition. Because of its offensive character, this still waste cannot be discharged into streams, ponds or sewers and it has therefore been usual to mix the still waste liquor with the water used to quench the hot coke removed from the coking ovens, thereby disposing of it. By this practice the still wastes are converted into steam and other dusty, acid-laden vapors which remain an unpleasant and destructive nuisance, deleteriously affecting steel work, painted structures, plant life, etc., and even this method of disposal cannot be followed where the hot coke is dry quenched.

The proper disposition of these waste liquors, therefore, has long been a serious problem and, so far as I am aware, efforts by others to effect their clarification have failed, due, in my opinion to the assumption made by other investigators that some of the various substances contained in the waste liquors were present in the form of fluid compounds. Such efforts as have been made have therefore proceeded on the theory that chemical treatment for separation was necessary and, as there are approximately ninety known different substances contained in the waste liquors, all proposed procedures for removing them chemically have proved impractical and unsuccessful.

Where my present process is practiced, no lime is added to the liquor, thereby saving the cost of the lime, and the usual fixed ammonia still may be employed as a second free ammonia still to recover a further quantity of free ammonia. The effluent then resulting is a weak, impure ammonia liquor. I have discovered that no appreciable quantities of known fluid compounds, other than phenol, are contained in this liquor, but that all of the other impurities exist therein as solids in mechanical suspension and salts in aqueous solution, capable of removal by mechanical means. However, my extensive investigations have also shown that because of the corrosive nature of the liquor and the tarry character of the solids in suspension such separation cannot be effected by any of the simple and obvious methods and I have therefore devised a method and apparatus for mechanically extracting the solids from the liquor, at the same time separating the tar and dirt from the ammonia salts, the liquor being kept in constant agitation to prevent agglomeration of the tarry insoluble particles.

Accordingly, the principal object of my present invention may be said to consist in providing a method and apparatus for economically separating the solids from the weak ammonia liquors, thereby purifying the liquors and at the same time segregating the solids to recover a dry and commercially valuable ammonium chloride powder. Other and further objects will appear from the following specification.

Referring to the drawings which form a part of this specification:

Figure 1 is a schematic illustration of apparatus in combination for carrying out my improved process.

Figure 2 is a similar illustration showing a somewhat different arrangement of apparatus for practicing a modification of my improved process, and Figure 3 illustrates on a larger scale and in greater detail the interconnected flash type stills shown in Figure 1.

As above stated, I have determined that the solids in the weak ammonia liquor are composed partly of inorganic matter in true aqueous solution and partly organic matter in mechanical suspension, the matter in suspension being so finely divided as to be imperceptible and the liquor appearing to be clear. This liquor differs in different plants and at different times in the operation of a particular plant, but in general its composition can be taken approximately as follows:

Inorganic solids in aqueous solution:

| | Grams per litre |
|---|---|
| Ammonium chloride $NH_4Cl$ | 9.93 |
| Ammonium sulpho-cyanate $NH_4SCN$ | .58 |
| Ammonium thio-sulphate $(NH_4)_2S_2O_3$ | .53 |
| Ammonium sulphate | .29 |
| Total solids in solution | 11.33 |

Organic solids in mechanical suspension:

| | Grams per litre |
|---|---|
| Sulphur | .12 |
| Tarry matter | .79 |
| Acetates and salts of other fatty acids | .04 |
| Catechol and homologues | .02 |
| Coal, coke dust, and other impurities | .10 |
| | 1.07 |

Briefly, my process for purifying this liquor and for extracting the valuable ammonium salts therefrom is as follows: The liquor is first treated to obtain a concentrated liquor, in which the insolubles appear in a flaky, nodular or granular form. This concentrated aqueous liquor is kept in a state of agitation to prevent the insolubles from settling out or agglomerating and the liquor is then filtered to remove the insolubles in a condition permitting them to be easily handled and stored or burned with other solid fuel. Thereafter the salts remaining in solution are dried by removing the remaining moistures from the filtrate. As the concentrated solution is highly corrosive and difficult to handle, this is preferably accomplished by spraying the filtrate in a flash drier or other similar desiccating apparatus designed to suddenly snap off the water. Thus treated, the salts are precipitated as a commercially valuable brown powder, the value of which may be increased by adding a decolorant, such as activated carbon to the filtrate and refiltering before drying the salts; or all or part of the powder may be redissolved, decolorant added, and the resulting solution filtered and passed to the desiccating apparatus. Due to the corrosive character of the liquor, concentration above twenty per cent should be avoided, and due to the normal tarry character of the solids in suspension, care must be taken to maintain the liquor in constant agitation to prevent agglomeration of the insolubles. Yet, since agitation at excessive speed or high temperatures render the corrosive effects of even weak ammonia liquor great, care must also be exercised to avoid unduly high temperatures or too violent agitation. When the phenolic content of the weak ammonia liquor is sufficient to be objectionable, I first treat the liquor with a deodorant, such as "Nuchar" or other activated carbon, having an affinity for the phenol, the deodorant being added in volume approximately equal to the phenolic content or sufficient to neutralize and adsorb the phenol and hold it in the liquor during the next succeeding steps of the process, such deodorant being ultimately filtered out with the other insoluble solids carried in suspension in the liquor.

The concentration of the weak ammonia liquor is preferably accomplished by progressively subjecting it to the effects of a plurality of interconnected flash type stills 20, 30, 40 and 50, the latter of which is heated by steam or other fluid heat medium supplied through the pipe 60. To avoid repetition, like parts of the several stills are indicated by reference characters having the same units figures, the several stills being substantially identical in construction. Thus, the still 50 consists of a plurality of vertical tubes 51 fed at their lower ends by the liquor supply pipe 47 and opening into an enclosed head chamber 52 under a dome-shaped baffle plate 53. Above the baffle plate a screen or foraminous plate 54 partitions the head chamber which is provided centrally of its top with an outlet pipe 55 for water vapor. As shown the head chamber extends below the upper ends of the tubes to provide an annular trough 56 and an outlet pipe leads from the bottom of the trough at 57. Steam condensing in still 50 is led through pipe 58 to a sump 59.

In operation, the hot steam circulating between the tubes of still 50 vaporizes water from the liquor in the tubes, the lighter portions of the vapor rising around the baffle, through screen 54, and out in the form of a finely divided mist. Portions of the rising vapor too heavy to pass through the screen are dropped back onto the baffle by which they are directed into the trough 56. The warm misty vapor passing the screen is utilized to heat the encased tubes of the similar still 40 to which it is conducted by the pipe 55, said vapors being condensed and drained as water into the sump 59 through pipe 48. The vapors flashed from the liquor of still 40 which are sufficiently light to pass as mist through screen 44, in turn, are conducted through pipe 45 to heat still 30 in which such vapors are condensed and drained as water into the common sump through pipe 38. Similarly vapors passing from still 30 are conducted to still 20, condensed and drained as clean water to the sump, while vapors rising from the liquor in the tubes of still 20 and passing as mist through its screen rise through pipe 25 to a condenser 65.

In the course of their concentration, the waste liquors pass in a substantially reverse direction, counterflow to the heat exchange, being first admitted through pipe 10 to the tubes of still 20 in which the distilled portions too heavy to pass the screen 24 are precipitated and collected in trough 26 and are led therefrom through pipe 27 to the tubes of still 30. The further concentrated liquor collected in trough 36 is led through pipe 37 to the tubes of still 40 and there further distilled, while the concentrate dropping from the screen 44 is directed by baffle 43 into trough 46 and led therefrom to the tubes of still 50 through pipe 47.

In this manner, the waste liquors may be very efficiently and economically concentrated, the stills operating on the vapor phase and the unit of lowest concentration 20, being under a vacuum created by the condenser, requires the least heat for operation. The intermediate units, 30 and 40, operate under progressively lesser degrees of vacuum and therefore require proportionately more heat, while the unit of highest concentration 50 is maintained at a neutral or plus pressure at the heat source.

Other methods and means may be devised for obtaining the concentrated liquor but I have found that certain conditions must be met if the valuable ammonia salts are to be economically extracted and these conditions are satisfied by the utilization of more than two interconnected flash type stills as above described. For instance it is necessary to keep the soluble inorganic solids in solution and to hold the tarry organic solids in suspension so that they will not agglomerate and settle out. It is therefore necessary to keep the liquor in a constant state of agitation as otherwise the organic solids will agglomerate and, as the liquor approaches the required concentration, the solubles will be precipitated. On the multiple effect flash type stills I preferably employ, the liquor is kept in constant agitation, actually travelling up through the separate stills at a speed of more than twenty feet per second (but less than sixty feet per second, as above this speed erosion of the stills occurs) bringing the volume down to approximately seven and one-half per cent of the original weak ammonia liquor volume. At this concentration the insolubles and organic substances, such as tar, catechols, homologues, fine coal and coke dust, separate into flaky, nodular or granular form. This separation of the insolubles apparently occurs between nine and six per cent of the original volume, or, differently stated, when the liquor is concentrated to a solid content between twenty and thirteen per cent. It will be found that the insolubles will begin to appear in this peculiar condition when the liquor reaches a concentration of about ten per cent of its original volume. At a concentration of five per cent of the original volume it is impracticable by agitation to prevent the insolubles from agglomerating into a pasty mass. The inorganic and soluble substances having been prevented from individual separation during the concentration of the liquor remain in solution.

The concentrated liquor discharged from the stills through pipe 57 is permitted to cool to room temperature (less than 100 deg. Fahr.), at the same time being slowly agitated to keep the insolubles from settling out. As the time required for this cooling is short, it may be conveniently effected in a surge tank 70 having approximately one hour capacity, the liquor being fed into the tank adjacent its bottom at one end and flowing out through a pipe 71 at the other end of the tank adjacent its top, a screw 72 operating to maintain the required agitation.

The insolubles are then removed from the liquor in a suitable tar extractor or, more preferably, in a rotary-type vacuum filter where the tar and other insolubles are practically all removed in a non-pasty formation capable of being handled, stored or readily fed into a furnace with other solid fuel. 74 indicates a rotary type vacuum filter into the trough 75 of which the cooled concentrate is fed at proper speed through the pipe 71. The liquor carrying the inorganic matter in solution is drawn by vacuum into the revolving drum 76 through its porous cylindrical walls and discharged from the drum adjacent its hub while the insoluble and organic solids are filtered out and adhere to the surface of the drum from which they are scraped by a blade 77 into a chute 78 by which they are discharged into a suitable receptacle 80.

The filtered liquor, now practically free of tars and other insolubles, is pumped through a pipe 79 into a mixing trough or surge tank 85, similar to the tank 70, where an inhibitor or decolorizing agent such as activated carbon is added from a supply at 98 and thoroughly mixed with the solution. The liquor thus treated is then fed through pipe 87 to a continuous rotary type vacuum filter 88, similar to the filter 75, where the decolorizing agent is removed to be deposited, if desired, into the receptacle 80 along with the tar and insolubles removed in the first filtering operation.

The remaining water is then snapped off to precipitate the soluble solids as a dry, marketable, ammonium chloride powder useful in storage batteries, for galvanizing and tinning processes, etc. The remaining water may be removed in a flash dryer or desiccating retort 90 which comprises a chamber of brick or concrete into which the concentrated solution is atomized or sprayed as a fine mist through a nozzle 91. Air or other dry gas, suitably heated by a burner 92, is introduced into the chamber through a duct 93 and drawn out by fan 94 through a dust collector 95. In mingling with the hot current of gas, the remaining moistures are driven from the solution and the solids are thrown down in the form of a dry powder at the bottom of the retort and may be removed therefrom through the gate 96.

The composition of this dry powder on a dry basis is approximately as follows:

| | Per cent |
|---|---|
| Ammonia $NH_3$ | 29.81 |
| Equivalent to ammonium chloride ($NH_4Cl$) | 90.51 |
| Chlorine (Cl) | 60.90 |
| Equivalent to ammonium chloride | 91.93 |
| Total sulphur compounds | 4.58 |
| Equivalent to ammonium sulphate $(NH_4)_2SO_4$ | 7.56 |
| Sodium, (Na) | 2.68 |
| Tar, organic matter, etc | 0.32 |

When a more refined product, or one having a lower percentage of impurities, is required, all or a portion of the powder may be re-dissolved by mixing with water from a water supply 86 to form approximately a ten per cent concentrated solution and this solution either again treated with a decolorizing agent and filtered, or filtered without adding any decolorizing material. This may be done by positioning the gate 96 to discharge the powder, or some portion of it, from the desiccating retort 90 into a conduit 97 which delivers the powder back to the mixing trough or surge tank 85 where water for re-dissolving the powder is added from a source 86, decolorant being also added from source 98 when desired. The solution then proceeds through the filter 88 and back to the desiccating retort where the further refined ammonium salts are again dried and thrown down.

I have found that by re-dissolving, re-filtering and re-drying the powder in this manner, the size of the particles or crystals can also be increased, thus adding to the value of the product. At the same time, any very fine tarry particles not removed in the initial filtering operation grow in dimension and may be completely filtered out when passed to the filter 88 the second time.

My process may be simplified where heat is cheaply available by immediately snapping off all the water from the weak ammonia liquor, instead of passing it through the flask stills shown in Figs. 1 and 3 thereby precipitating all the solids, both soluble and insoluble, as a powder, and then mixing the powder with water to form a concentrated liquor containing about ten per cent, (but not more than twenty per cent) of solids, the resulting fluid being treated in substantially the same manner as described with respect to the concentrate obtained from the flash stills. Where this modification of the process is to be practiced I prefer to employ apparatus as illustrated in Figure 2 which may be employed in lieu of the apparatus shown in Figs. 1 and 3, and in which 190 indicates a flash dryer or desiccating retort similar to the dryer 90, a mixing box or surge tank similar to the tank 85 is indicated at 185, and a tar filter similar to the filter 88 is indicated at 188, all comparable parts of the modified apparatus being designated by the same reference figures with the addition of 100 to avoid repetition.

Here, the weak ammonia liquor is fed directly to the atomizer 191 of the drying retort through supply pipe 110 and dry air or other gas, suitably heated by burner 192, is introduced into the retort through a duct 193 and drawn out through a dust collector 195 to a stack. In mingling with the hot gas current, all water is driven off, and the solids, both soluble and insoluble, are precipitated or thrown down as powder at the bottom of the retort from which the powder is discharged through gate 196 into a conduit 197 and carried to the surge tank 185, there to be mixed with water from a source 186 to provide a liquor of not more than twenty per cent concentration. If desired, decolorant may be added to the mixture from a source 198. The mixture is constantly agitated in the mixing box 185 for from twenty to sixty minutes to thoroughly dissolve the valuable soluble salts, to prevent agglomeration of the insolubles and to properly mix in any decolorant. The concentrated liquor thus obtained then flows from the surge tank to the tar filter 188 where all the undissolved solids in suspension, including any decolorant are removed, the filtrate being pumped to the desiccating retort where the water is snapped off to throw down a refined and commercially valuable ammonium chloride salt.

Where a more highly refined product is required, the ammonium chloride powder may be again dissolved, treated and dried, the size of the crystals increasing with each filtering and the powder becoming cleaner and whiter with repeated treatments of the decolorizing agent.

On the other hand, where a highly refined product is unnecessary, as for usual commercial purposes, the apparatus may be continuously operated after the first hour by adjusting the gate 196 to return only a portion of the powder to the surge tank 185, permitting the balance to run off as finished product. For illustration, if the gate is adjusted to discharge one half the powder and to deliver the other half into the conduit 197, eventually one half of the product will be at least twice refined and filtered, one quarter will be filtered three times, one eighth will have been redissolved and refiltered four times, etc., etc., the more highly refined white crystals mixing with the smaller and darker crystals to obtain a product of satisfactory quality.

What I claim and desire to secure by Letters Patent is:

1. A disposal process for the treatment of weak ammoniacal waste liquors from coal distillation plants, containing tar, insoluble solids, soluble salts and other impurities and in which the major portion of the ammonia is present as ammonium chloride, which comprises the steps of evaporating said weak ammoniacal waste liquors thereby producing a concentrated liquor containing all of the tars, insoluble solids and impurities of the original liquor at a strength where the insolubles separate, and continuously agitating the liquor during the concentration step to prevent segregation and precipitation of the tars and insoluble solids, filtering the concentrate to remove tars and insoluble solids, flashing the moisture contained therein by spraying the filtrate into a stream of heated gaseous material to precipitate the soluble salts as a dry powder, consisting largely of ammonium chloride.

2. A disposal process for the treatment of weak ammoniacal waste liquors from coal distillation plants, containing tar, insoluble solids, soluble salts and other impurities and in which the major portion of the ammonia is present as ammonium chloride, which comprises the steps of adding an activated carbon and of evaporating said weak ammoniacal waste liquors thereby producing a concentrated liquor containing all of the tars and insoluble solids of the original liquor at a strength where the insolubles separate, and continuously agitating the liquor during the concentration thereof to prevent segregation and precipitation of the impurities, filtering the concentrate to remove tars and insoluble solids, including the activated carbon, to be subsequently burned, adding activated carbon to the filtrate, refiltering the filtrate, and flashing the moisture contained in the filtrate by spraying the filtrate into a stream of gaseous material to precipitate the soluble salts as dry powder, consisting largely of ammonium chloride.

3. A disposal process for the treatment of weak ammoniacal waste liquors from coal distillation plants, containing tar, insoluble solids, soluble salts and other impurities and in which the major portion of the ammonia is present as ammonium chloride, which comprises the steps of evaporating weak ammoniacal waste liquors thereby producing a concentrated liquor containing all of the impurities of the original liquor at a strength where the insolubles separate, agitating the liquor during the concentration thereof to prevent segregation and precipitation of the impurities, filtering the concentrate to remove tars and insoluble solids, flashing the moisture contained therein by spraying the filtrate into a stream of heated gaseous material to precipitate the soluble salts as a dry powder, consisting largely of ammonium chloride, and improving the quality of said dry powder by dissolving the dry powder in water to form a concentrated solution, adding activated carbon, filtering the concentrate to remove the activated carbon and certain impurities adsorbed therein, and again flashing the moisture contained in the filtrate by spraying it into a stream of heated gaseous material to precipitate the soluble salts as dry powder, consisting largely of ammonium chloride, in a more refined condition.

4. A disposal process for the treatment of weak ammoniacal waste liquors from coal distillation plants, containing tar, insoluble solids, soluble salts and other impurities and in which the major portion of the ammonia is present as ammonium chloride, which consists in passing the liquor through a series of flash stills at a high speed to concentrate it and simultaneously to continuously agitate it to prevent segregation and precipitation of the tars and insoluble solids, filtering the concentrate to remove tar and insoluble solids, and flashing the moisture contained in the filtrate to recover clean water and water vapor, by spraying it into a stream of heated gaseous material and precipitating the soluble salts as dry powder, consisting largely of ammonium chloride.

5. A disposal process for the treatment of weak ammoniacal waste liquors from coal distillation plants, containing tar, insoluble solids, soluble salts and other impurities and in which the major portion of the ammonia is present as ammonium chloride, flashing all the moisture contained in said liquors by spraying it into a stream of heated gaseous material, and depositing all tars, insoluble solids and soluble salts, adding water to said residue to produce a concentrated liquor, and continuously agitating said liquor to prevent segregation and precipitation of the tars and insoluble solids, filtering the concentrate to remove tars and insoluble solids, and flashing the moisture contained in said concentrate by spraying it into a stream of heated gaseous material to deposit the soluble salts as dry powder, consisting largely of ammonium chloride.

6. A disposal process for the treatment of weak ammoniacal waste liquors from coal distillation plants, containing tar, insoluble solids, soluble salts and other impurities and in which the major portion of the ammonia is present as ammonium chloride, which consists in passing the liquor through a series of flash stills to concentrate it and at a sufficiently high speed to prevent segregation and precipitation of the tars and insoluble solids, filtering the concentrate to remove tar and insoluble solids, and flashing the moisture in the filtrate by spraying it into a stream of heated gaseous material to remove the moisture in the form of clean water and water vapor and to precipitate the soluble salts as dry powder, consisting largely of ammonium chloride, dissolving the dry powder to form a concentrated solution, adding activated carbon, filtering the concentrate to remove the activated carbon and certain impurities adsorbed therein, and again flashing the moisture in the filtrate to precipitate the soluble salts as dry powder, consisting largely of ammonium chloride of improved quality, and increase the size of the particles thereof.

7. A disposal process for the treatment of weak ammoniacal waste liquors from coal distillation plants, containing tar, insoluble solids, soluble salts and other impurities and in which the major portion of the ammonia is present as ammonium chloride, which comprises the steps of evaporating said weak ammoniacal waste liquors producing a concentrated liquor containing all of the tars and insoluble solids of the original liquor, continuously agitating the concentrate to prevent the segregation and precipitation of the impurities, filtering the concentrate to remove tars and insoluble solids, flashing the remaining moisture to separate clean water and water vapor by spraying the filtrate into a stream of heated gaseous material to precipitate the soluble salts as a dry powder, continuously withdrawing portions of said powder as a finished product, continuously withdrawing other portions of said powder for further treatment, and adding water to the latter portions of said powder to form a concentrated solution, adding activated carbon to said solution, filtering out said activated carbon and its adsorbed impurities, and again flashing moisture contained in the filtrate and recovering clean water, and precipitating the soluble salts as dry powder, consisting largely of ammonium chloride with the soluble salts precipitated from the original liquor, to improve the quality of the finished product.

8. A disposal process for the treatment of weak ammoniacal waste liquors from coal distillation plants, containing tar and insoluble solids of such character as to preclude their separating by settling, and including soluble salts and other impurities and in which the major portion of the ammonia is present as ammonium chloride, which comprises the steps of distilling off aqueous portions of the liquor to concentrate it to less than 10% of its original volume while keeping the liquor continuously agitated to prevent segregation and precipitation as the liquor becomes concentrated, filtering the concentrated liquor to remove tars and insoluble solids, and flashing the moisture in the filtrate to separate clean water and water vapor and precipitating the soluble salts as a dry powder, consisting largely of ammonium chloride.

WILLIAM O. RENKIN.